United States Patent [19]

Biringer

[11] 3,715,647

[45] Feb. 6, 1973

[54] FREQUENCY CONVERTER FOR CONVERTING MULTI-PHASE LOW FREQUENCY ALTERNATING CURRENT INTO SINGLE-PHASE HIGHER FREQUENCY ALTERNATING CURRENT

[75] Inventor: Paul Peter Biringer, Toronto, Ontario, Canada

[73] Assignee: Ajax Magnethermic Corporation, Warren, Ohio

[22] Filed: March 31, 1971

[21] Appl. No.: 129,889

[52] U.S. Cl. ....................321/7, 307/318, 307/317, 321/58, 321/69

[51] Int. Cl. ....................H02m 5/20

[58] Field of Search ..............307/318; 321/7, 58, 69; 328/20

[56] References Cited

UNITED STATES PATENTS

| | | | |
|---|---|---|---|
| 3,436,641 | 1/1969 | Biringer | 321/7 |
| 3,250,919 | 5/1966 | Maass | 307/318 X |
| 3,235,810 | 2/1966 | Adams | 307/318 X |
| 3,493,838 | 2/1970 | Gyugyl et al. | 321/7 |
| 3,546,562 | 12/1970 | Havas et al. | 321/7 |

*Primary Examiner*—William M. Shoop, Jr.
*Attorney*—J. H. Slough

[57] ABSTRACT

There is disclosed herein a solid state frequency changer wherein multiple phase supply current is converted to single phase current of increased frequency. Each line of the multiple phase supply is provided with a pair of reverse switching rectifiers or PNPN devices connected back-to-back in series therewith. A load is connected between a common point of the multiple phase supply and a ground or an artificial neutral point.

4 Claims, 5 Drawing Figures

INVENTOR
Paul Peter Biringer
BY
J. H. SLOUGH
ATTORNEY

INVENTOR
Paul Peter Biringer
BY
J. H. SLOUGH
ATTORNEY

FREQUENCY CONVERTER FOR CONVERTING MULTI-PHASE LOW FREQUENCY ALTERNATING CURRENT INTO SINGLE-PHASE HIGHER FREQUENCY ALTERNATING CURRENT

This invention relates to a frequency changer and particularly to a solid state frequency multiplier.

Known frequency multipliers utilizing solid state switching devices such as silicon controlled rectifiers have the disadvantage that they require complex firing circuits to achieve synchronous switching during each cycle of the operation. An example of such solid state frequency multipliers will be found in U.S. Letters Pat. No. 3,436,641 issued Apr. 1, 1969, to the present inventor. In applicant's prior invention, pairs of silicon controlled rectifiers were disposed back-to-back in parallel in each line of a three phase supply and triggering means responsive to a firing circuit were employed to operate the switches at selected times.

The present invention utilizes commercially available reverse switching rectifiers which are solid state, two terminal, four layer PNPN devices. In the reverse direction, each device initially blocks current; but when the voltage reaches a certain level, it automatically switches to a low impedance state whereby it will conduct current until such current drops to zero. In the forward direction, current conduction is similar to that in normal junction rectifier.

The above described reverse switching rectifiers are disposed in pairs in series with each phase of a multiple phase supply as will hereinafter be described in detail.

It is an object of this invention to achieve balanced loading on each phase of a power source without the use of moving parts such as contactors, tap changers, or the like.

It is a further object of this invention to statically generate harmonics of the alternating source by using solid state switching elements on the input or supply side.

Yet another object of this invention is to generate a single phase output from a multiphase source which is symmetrically distributed at the source.

It is a further object of this invention to prevent high current pulses in the supply line generating harmonics of the source.

A still further object of this invention is to provide a frequency multiplier of high efficiency.

Yet another object of the invention is to provide a solid state frequency multiplier reflecting a negligible amount of harmonic current into the supply line.

Another object of the invention is to provide a frequency multiplier having means to make the operation thereof independent of supply voltage variation.

Figure 1A:
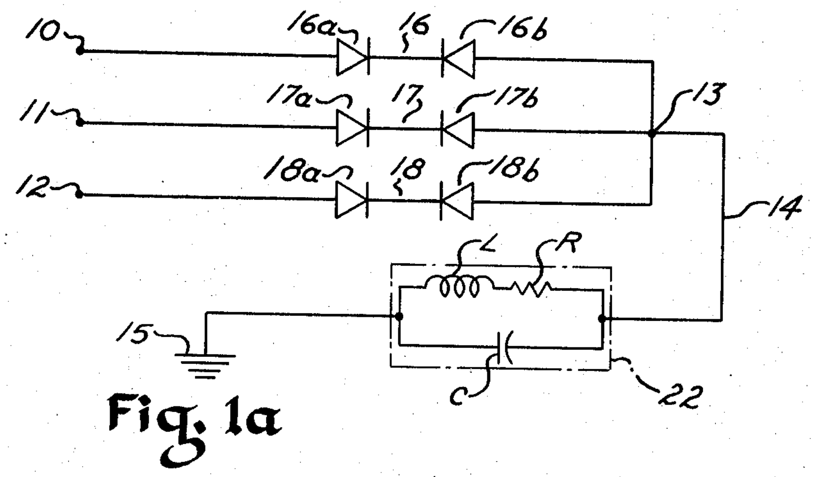
Figure 1B:
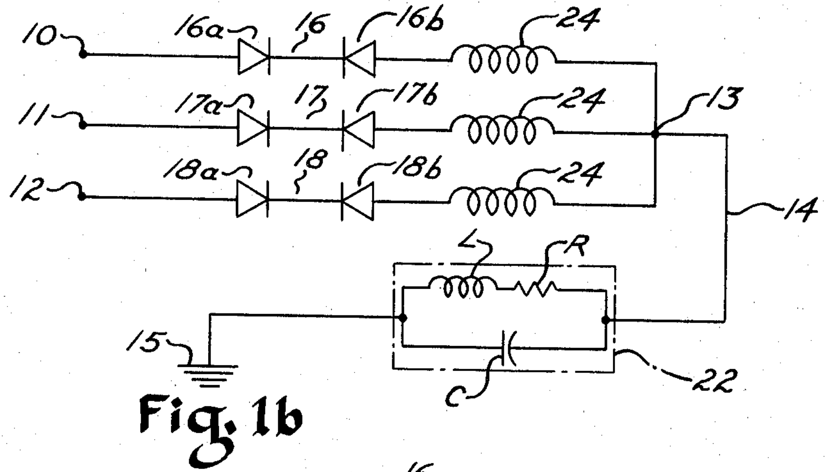
Figure 1C:
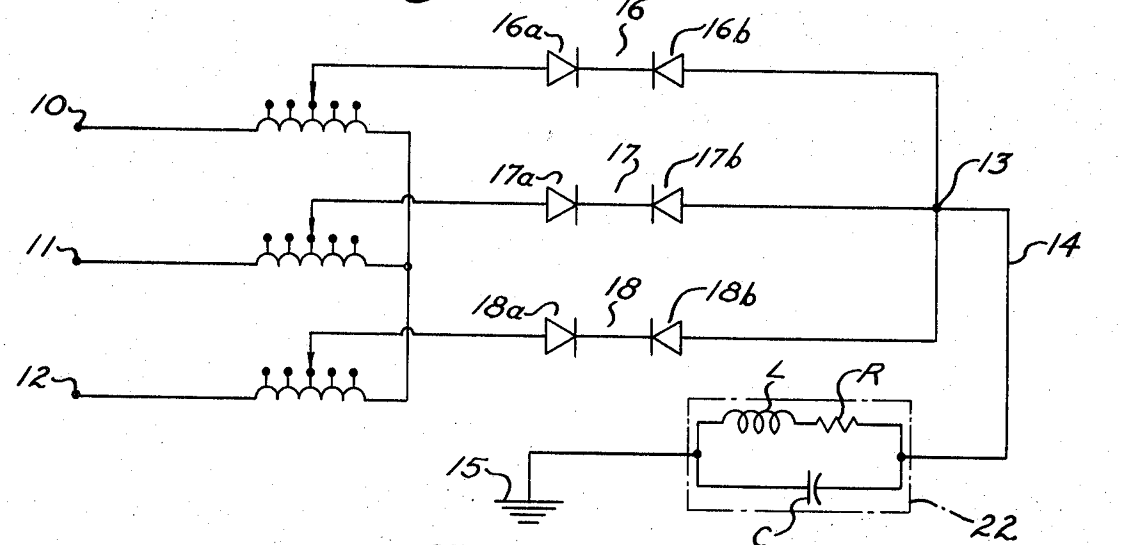
Figure 2:
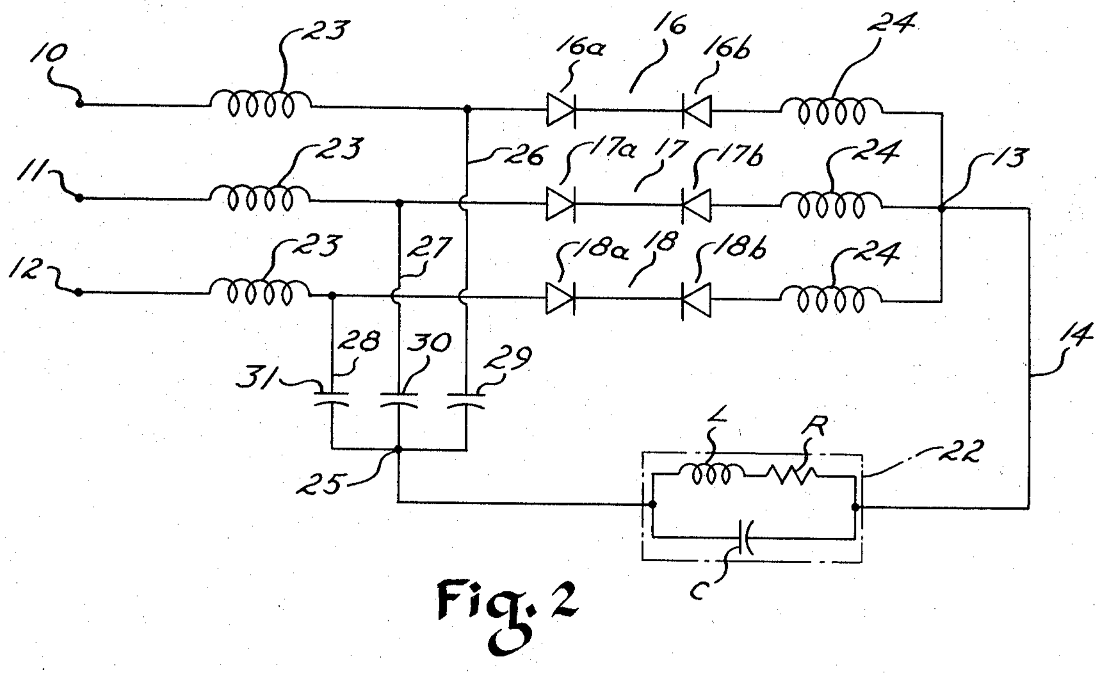
Figure 3:
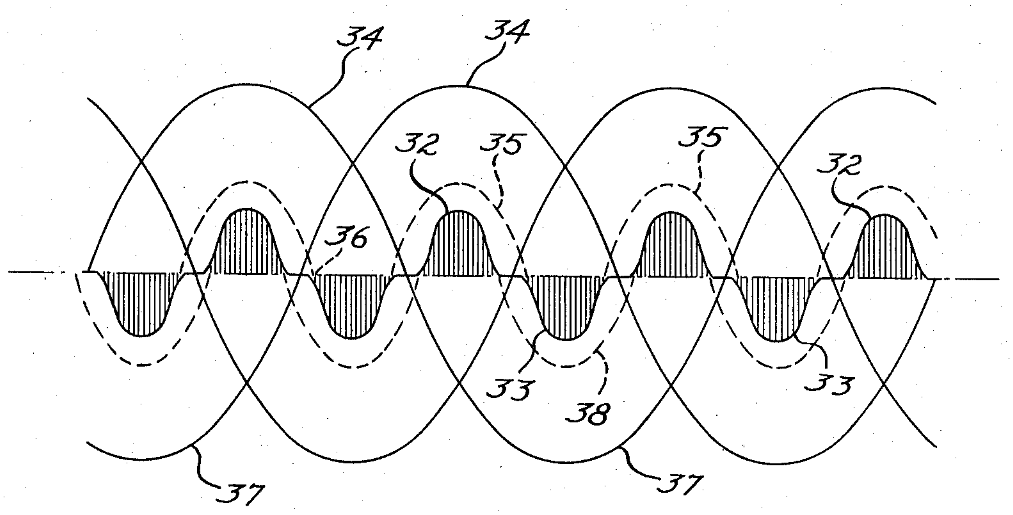

Other objects of the invention and the advantages thereof will be readily understood from the following specification and the accompanying drawings, in which said drawings:

FIG. 1*a* is an electrical diagram of a basic circuit for a frequency tripler made according to the present invention;

FIG. 1*b* is an electrical diagram of a modified circuit for a frequency tripler made according to the present invention;

FIG. 1*c* is an electrical diagram of still another modified circuit for a frequency tripler made according to the present invention;

FIG. 2 is an electrical diagram of a further modified circuit for a frequency tripler according to the present invention; and FIG. 3 is a diagrammatic view showing voltage and current wave forms obtained in use of the frequency changer of this invention.

Referring now to the basic diagram of FIG. 1*a*, a three phase current supply is shown at lines 10, 11, and 12, and each line 10, 11, and 12 of the three phase supply is provided with a pair of reversible switching rectifiers 16, 17, or 18, comprising individual rectifiers **16*a*–16, 17*a*–17*b*, and 18*a*–18*b*, respectively, each of said pairs being connected in series and back-to-back in each line of the supply. Each said rectifier has two terminals and comprises a four layer PNPN device. The neutral point of the supply is shown at 15 and is grounded. A terminal point of the second of said pair of reversible switching rectifiers 16*b*, 17*b*, 18*b* is connected at a common point 13, and the load, which is preferably a low-frequency induction furnace, is connected between said common point 13 and the neutral point 15**. The load circuit comprising an induction furnace with its inherent inductance L and resistance R in parallel with compensating capacitors C is dimensioned so that stable oscillations at three times the supply frequency are obtained. In the forward direction, each reversible switching device conducts currents in the same manner as a normal rectifier, but in the reverse direction, said device will initially block current and then, at a certain voltage level, will switch to a low impedance state and will conduct until the current is reduced to zero.

Because the pairs of switching devices **16*a*–16*b*, 17*a*–1718*a*–18*b* are disposed back-to-back or oppositely in series with the phase lines 10, 11, and 12, respectively, voltage or current which is said to be in the forward direction with respect to one switching device is automatically reversed with respect to the other said device and vice versa. Thus, if an upper voltage wave form 34 of FIG. 3 represents a forward voltage through switching device 16*a*, 17*a* or 18*a* which acts as a normal rectifier, said voltage is in the reverse direction with respect to devices 16*b*, 17*b*, or 18*b*, respectively. Therefore, devices 16*b*, 17*b*, 18*b* will not conduct until the voltage has risen to a certain level at which point current will begin to flow as indicated by the upper dotted line wave form 35. When current reaches the zero crossover point as indicated at 36, the switching devices 16*b*, 17*b*, or 18*b* will cease to conduct. Thereafter the voltage will reverse direction as diagrammatically indicated by the lower voltage wave form 37. Subsequently the voltage can then be said to be forward with respect to the switching devices 16*b*, 17*b*, 18*b* and reversed with respect to the switching devices 16*a*, 17*a*, or 18*a*, whereby current will not flow until the voltage has reached a predetermined level as indicated by the lower dotted line current wave form 38. The voltage from the three phase supply at lines 10, 11, and 12 is thus delivered to the load 22** in single phase at triple its original frequency.

It will be understood that the three phase supply has a higher supply voltage than the reverse switching voltage level of the individual solid state switching devices **16*a*–16, 17*a*–17*b*, and 18*a*–18*b***, and the point of firing of the switching rectifiers is dependent upon the value of the supply voltage. Increased supply voltage will yield longer conduction intervals. FIG. 1*c* shows one means for adjusting the supply voltage in the form of autotransformers 40, 41 and 42 and tap switches 43, 44, and 45 interposed in the lines 10, 11, and 12, respectively.

One of the difficulties with a circuit of the type shown in FIG. 1 is that the moment two lines conduct simultaneously, there will be a direct short circuit across line to line of the supply. This will occur for only a brief period at very low voltage near the voltage cross-sover point and is graphically shown in FIG. 3 by the overlapping of the current wave forms 35 and 38. To limit the short circuit currents and at the same time limit the third harmonic current from the line, the circuits of FIGS. 1*b* and 2 are suggested. In both figures, linear reactors 24 are disposed between said pairs of switching devices 16*a*–16*b*, 17*a*–17*b*, and 18*a*–18*b*, respectively, and the common point of connection of the three phase supply at 13 to suppress or limit the short circuit currents to acceptable values. This results in a current flow substantially as indicated in FIG. 3 by the shaded upper and lower wave forms 32 and 33, respectively.

In the diagram of FIG. 2, additional linear reactors 23 are placed in the line 10, 11, and 12 ahead of said pairs of switching devices. The linear reactors 23 placed in each line of the three phase supply also act to limit the line current when more than one solid state switching device conducts simultaneously. The linear reactors 23 are further filtering reactors which act together with capacitors to filter harmonics in the line current and to achieve unity power factor at the supply terminals 10, 11, and 12. The third harmonic currents are eliminated from the line by creating an artificial neutral point 25 at the common connection point of three lines 26, 27, and representing the junction of the three capacitors 29, 30 and 31 which are in turn connected to lines 26, 27 and 28 representing the three phases of the supply 10, 11 and 12 after having passed through the liner reactors 23. Capacitors 29, 30, and 31 are disposed in the lines 26, 27, and 28, respectively, to provide a path for the triplen frequency components of the current and at the same time act as a shunt for the other odd numbered frequency components of the line current, including the fundamental. The circuit of FIG. 2 makes operation of the tripler less dependent of supply voltage variation.

While the present application discloses use of a particular reversing switch rectifier, other means of creating reverse switching by solid state devices or silicon controlled rectifiers may be used.

Although the circuit of this invention will change a three phase supply frequency to a single phase of triple frequency, it will be readily understood that it would be very easy to adapt this circuit for higher multiplications. An important advantage of the circuit is its simplicity in that no firing circuits or control circuits are required, the multiplication being achieved by two terminal elements.

It will be understood that many changes in the details of the invention as herein described and illustrated may be made without, however, departing from the spirit thereof or the scope of the appended claims.

I claim:

1. A solid state frequency changer for use with a multiphase source of alternating current of predetermined frequency and adapted to deliver a single phase output current of relatively higher frequency into an LCR type of load, said frequency changer comprising: a pair of solid state, reverse switching rectifiers disposed in series and back-to-back in each phase of the multiphase source; means for connecting each of said pairs in series with each phase of the multiphase source; each of said pairs of reverse switching rectifiers adapted to conduct currents as in a normal rectifier in the forward direction and, in the reverse direction, to initially block current and then, at a certain voltage level, switch to a low impedance state and conduct until the current is reduced to zero; higher freqhency output means connected to each of said pairs of reverse switching rectifiers comprising a common connection for said reverse switching rectifiers; and means for connecting said common connection to a load.

2. A solid state frequency changer as set forth in claim 1: linear reactors disposed in series in each phase of the multiphase source between said reverse switching rectifiers and said common connection to suppress short circuit currents when two phases of said multiphase source conduct simultaneously.

3. A solid state frequency changer as set forth in claim 2: linear reactors disposed in series in each phase of the multiphase source between the source and said reverse switching rectifiers; said higher frequency output means comprising a line from said common connection to an artificial neutral formed by the junction of lines connected to respective of said phases of said multiphase source intermediate said first linear reactors and said reverse switching rectifiers, capacitors being connected in series with each of said last mentioned lines.

4. A solid state frequency changer as set forth in claim 1: said changer including voltage regulation means disposed at the input of said multiphase source to adjust output power to the load.

* * * * *